Nov. 30, 1948.    G. A. TINNERMAN    2,455,028
FASTENING DEVICE
Filed July 16, 1945    2 Sheets-Sheet 1
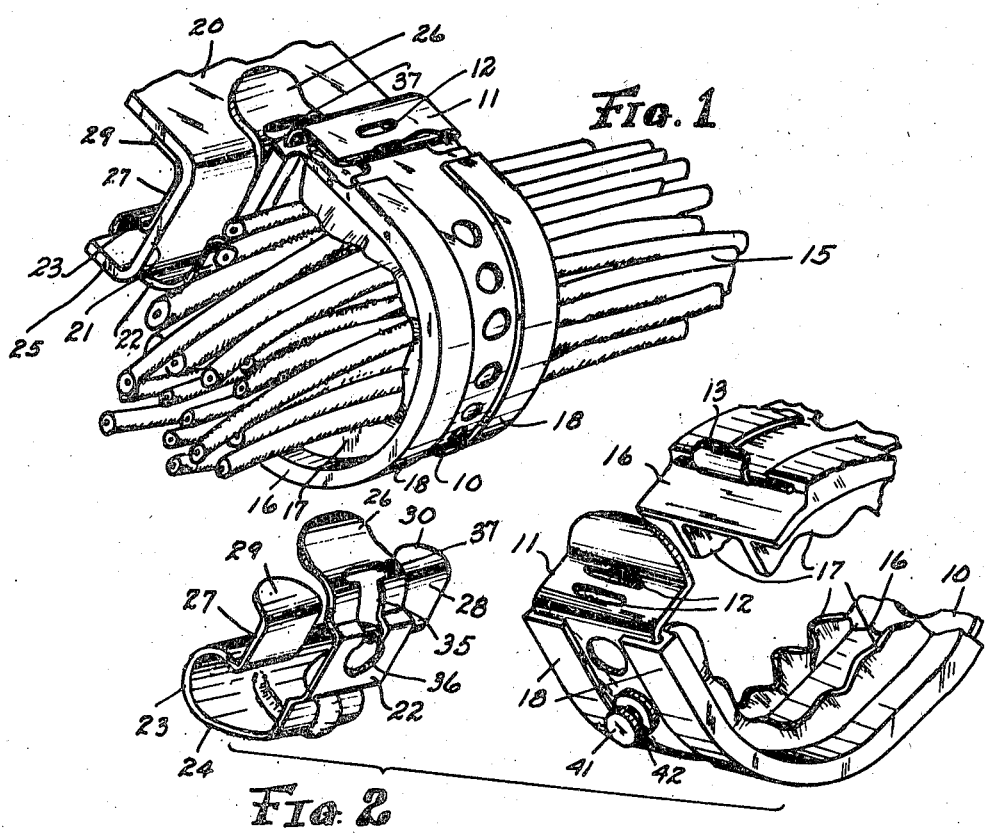
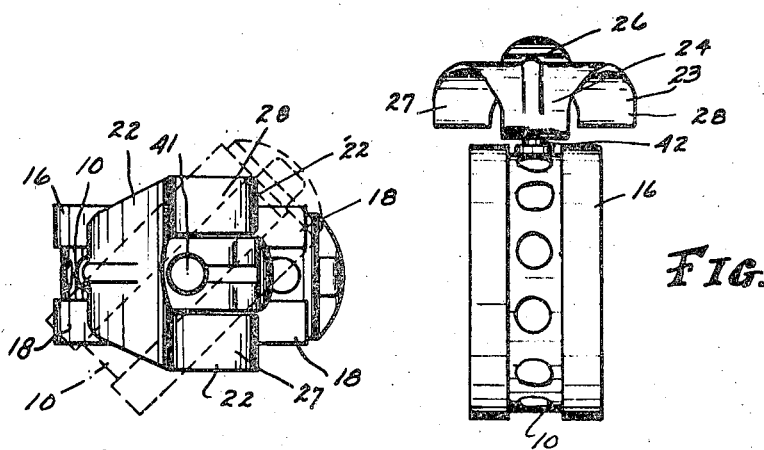
INVENTOR.
GEORGE A. TINNERMAN
BY
Bates, Teare v McBean
ATTORNEYS

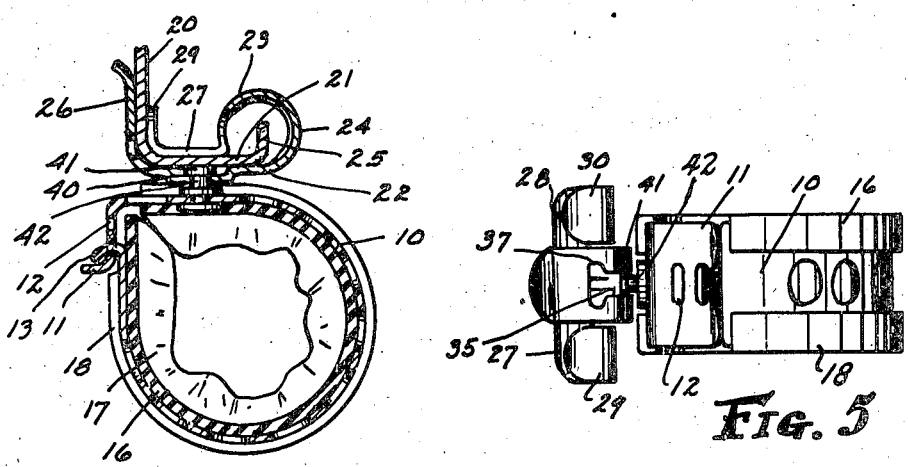
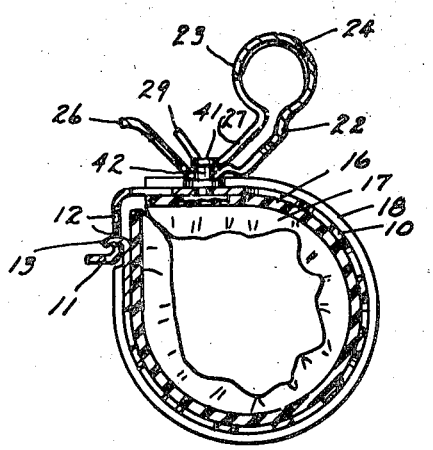

Patented Nov. 30, 1948

2,455,028

UNITED STATES PATENT OFFICE 2,455,028

FASTENING DEVICE

George A. Tinnerman, Cleveland, Ohio, assignor to Tinnerman Products, Inc., Cleveland, Ohio, a corporation of Ohio Application July 16, 1945, Serial No. 605,218

9 Claims. (Cl. 248—74)

This invention relates to fastening devices and particularly to those adapted for use in holding a bundle of wires, such as electrically insulated wires, used in airplane work.

One of the problems incident to the retention of a bundle of electrically insulated wires against a support, such as the framework of an airplane, is the need for opening the wire supporting clamp to add additional wires or to remove wires from the bundle and to relock the clamp without disturbing its connection to the supporting structure. An additional problem is to provide a clamp that will prelatch so as to hold the wires temporarily assembled in a bundle before the bundle is completed, and then to attach the clamps without the necessity for drilling holes in the supporting structure and without the necessity for requiring the clamp to be positioned in a definite location with respect to the structure. The presence of necessary equipment and the constant change to meet varying conditions of service make desirable a fastening arrangement that will enable the clamp to be attached at any desired position to the supporting structure that normally forms part of the framework of an airplane. The invention is not particularly limited to use in aircraft work, but is well adapted for use wherever structural shapes comprise the supporting structure to which the clamp is to be attached.

Referring now to the drawings, Fig. 1 is a perspective view of a clamp embodying the present invention; Fig. 2 is an exploded perspective view of the clamp and its associated fastening device; Fig. 3 is an end elevational view of the assembled clamp structure; Fig. 4 is a top plan view of the assembled structure; Fig. 5 is an end elevation of the assembled structure taken from the side opposite that shown in Fig. 3; Fig. 6 is a transverse section through the assembled clamp and illustrating a manner of attachment thereof to a supporting structure; Fig. 7 is a sectional view taken on a plane at right angles to that of Fig. 6, and Fig. 8 is a sectional view through the clamp and illustrating the manner of attachment thereof to the fastener.

As shown in the various figures, the clamp comprises a strap 10 of preferably spring sheet metal that is straight in its cross dimension and is bent into the form of a loop with the ends adjacent each other but separated when the clamp is in the state of equilibrium. The ends, however, are adapted to be interconnected, and for such purpose one end is bent inwardly, as at 11, and is provided with slots 12, while the other end has a tongue 13 struck outwardly therefrom and adapted to be selectively positioned in one of the slots in clamping position about a bundle of wires, indicated in general at 15.

Where the wires are covered with electrical insulating material it is desirable that the clamp be provided with a cushioning medium so as yieldingly to hold the wires in assembled position without the danger of injuring the insulation in the event of any possible relative movement between the wires and clamp during use. Accordingly, I have shown a cushion in the form of a channel-shaped strip of elastic material 16 that is provided with inwardly projecting, peripherally extending ribs 17 that yield under pressure exerted by the closing of the clamp around a bundle of wires. The strip may be held in place upon the clamp body by marginal strips 18 that extend inwardly of the strip 16 and engage the outer face of the strap 10, as is shown particularly in Fig. 2.

To attach the clamp to a supporting structure such as a structural shape in the form of an angle bar 20 which has a flange 21 thereon, I utilize a fastener which is formed from a single strip of metal having spring-like characteristics, and which is bent intermediately to provide two arms 22 and 23, respectively, which extend in the same general direction. The intermediate portion 24 is preferably shaped in the form of a loop so as to extend around a flange 25 on the part 21 and also to impart spring-like characteristics to the arms of the fastener.

In the preferred arrangement, the arm 22 has the free end 26 thereof extending laterally therefrom and out of the plane thereof so as to engage the outer surface of the angle bar 20 in the assembled position as is shown in Figs. 1 and 6. Additionally, in the preferred arrangement, the arm 23 is bifurcated to form fingers 27 and 28 that are disposed on opposite sides of the arm 22. Each finger has the portion adjacent the free end thereof extending laterally out of the plane thereof as is indicated at 29 and 30 respectively, so as to bear against the inner face of the angle bar 20 as is shown in Figs. 1 and 6. In the normal position of equilibrium the arms 22 and 23 are sufficiently close together that they must be sprung apart to receive the angle bar, wherefor the spring tension operates to retain the fastener in position upon the bar. In this way the fastener may be readily snapped over the bar at any desired location that may be convenient for positioning the clamp with respect to the bundle of wires that is held thereby. Additionally, the arm 22 and the fingers 27 and 28 operate to effect a three-point engagement with a supporting surface and thereby to obtain an even bearing thereon.

To attach the clamp to the spring fastener, the arm 22 has a slot which might be termed a keyhole slot 35 therein, one end of which terminates in a circular portion 36 adjacent the mid portion of the arm 22, and the other end of which terminates in a transversely extending slot 37 that is located on the laterally offset part 26. Additionally, the arm 22 is deformed to provide a boss 40 that acts as a bearing surface for the clamp and also as a receptacle for the head 41 of a pin 42 that is riveted or otherwise securely fastened to the strap 10. The pin and slot connection thus provide a swivel for the clamp and thereby enables the clamp to move with respect to the supporting surface so as to accommodate any necessary curvature in the bundle of wires or to insure alignment with other clamps in the complete assembly.

Fig. 8 illustrates the manner of assembling the clamp to the spring fastener and shows the position of the pin after it has been passed through the transverse slot 37 and moved slightly along the slot 35. The pin is moved until the circular portion 36 is reached at which time the assembly has the arrangement illustrated in Fig. 6. The width of the slot between the end portions thereof is preferably slightly less than the diameter of the pin so that slight pressure must be exerted to move the pin lengthwise of the slot until it occupies the final position with respect thereto.

A clamp assembly embodying the features of the present invention is advantageous in that it is capable of being located at any position along the angle bar and therefore can be assembled to the supporting structure in accordance with the particular requirements in any place of use. After attachment to the supporting structure, the clamp may be readily unsnapped to place wires therein without disturbing the utility of it for supporting other wires and without disturbing the connection between the clamp and the supporting structure. The clamp is suitable, therefore, as a prelatching medium to hold a bundle of wires temporarily together before the fastener is snapped into place on the angle bar, whereby the assembly is greatly facilitated, particularly in aircraft structures where space limitations are restricted by the presence of other equipment. A further important characteristic of the invention is the fact that the clamp may be quickly shifted along the bar to another position thereon in the event that such movement is necessary to accommodate other equipment that might subsequently be added. Such shifting may be accomplished without weakening the supporting structure by drilling holes therein, thereby enhancing the value of the clamp as a convenient means for general application in the assembly of one article upon another.

I claim:

1. A fastening device comprising a strip of metal bent intermediately to provide two arms which extend in the same general direction, one of the arms being narrower than the other and having a slot extending longitudinally thereof, and having a boss deformed therefrom adjacent one end of the slot and providing a recess for the head of a pin that is adapted to extend through the slot, and the other arm being bifurcated adjacent the free end thereof, the bifurcated portions being disposed on opposite sides of the first arm and cooperating therewith to provide a three-point engagement with a support that extends therebetween.

2. A fastening device comprising a strip of metal bent intermediately to provide two arms which extend in the same general direction and have free end portions extending out of the planes thereof and in the same general direction, one of the arms having a slot extending longitudinally thereof, said slot terminating at one end adjacent the mid-portion of the arm, and at the other end upon the said end portion thereof, said slot having enlarged portions at each end thereof and said arm having a boss deformed therefrom adjacent one end of the slot.

3. A fastening device comprising a strip of sheet metal bent intermediately to provide two arms which extend in the same general direction, each arm having an end portion bent laterally out of the plane thereof, and in the same general direction with respect thereto, one of the arms having a keyhole slot therein occupying a portion of the arm and also occupying a part of the laterally bent portion thereof, and the other arm having two laterally spaced fingers that are disposed respectively at opposite sides of the slotted arm, said fingers and slotted arm cooperating to receive a support therebetween and operating to be retained thereon solely by spring tension of the arms against the support.

4. A spring clip comprising a strip of metal bent intermediately to provide two arms which extend in the same general direction, one of the arms being relatively narrow and the other arm being bifurcated and having the bifurcated portions disposed on opposite sides of the narrow arm, said arms having spring-like characteristics, whereby the fastener may be held by spring tension upon a supporting structure that is inserted therebetween, the narrow arm having a keyhole slot therein adapted to receive the shank of a headed pin for swivelly attaching another member.

5. The combination of a clamp comprising a loop formed to embrace an article or articles to be held and a spring fastener in the form of a generally U-shaped clip having two arms each provided with a free end portion extending in the same general direction out of the plane of the arm, one of the arms having a slot therein continuing into the free end portion of such arm where said slot is laterally enlarged, said clamp having a headed pin, the head of which is adapted to pass through the enlargement of the slot and the shank of which is adapted to occupy the slot with the head of the pin positioned behind the arm to provide a swivel connection between the clamp and fastener.

6. In a device of the character described, the combination of a clamp in the form of a loop having the ends thereof detachably interconnected, a spring fastener of generally U-shaped formation adapted to receive a support therebetween, one of the arms being offset away from the other arm and having a slot therein extending beyond the offset and terminating beyond the offset in an enlarged opening, and the clamp having a headed pin carried thereby and adapted to have the head of the pin passed through the enlarged opening and the shank of the pin to occupy the slot in the fastener to provide a swivel connection for the clamp upon the fastener.

7. A fastening device comprising a strip of metal bent intermediately to provide two arms which extend in the same general direction and have free end portions extending out of the planes thereof and in the same general direction, one of the arms having a slot extending longitudinally thereof, said slot terminating at one end adjacent the mid-portion of the arm, and at the other end upon the said end portion thereof, said slot having an enlargement at one end thereof in said end portion and said arm having a boss deformed therefrom adjacent the other end of the slot.

8. A fastening device comprising a strip of sheet metal bent intermediately to provide two spring arms which extend in the same general direction, each of the arms having a flange at its free end, whereby said arms may snugly embrace two angularly related portions of a supporting member, one of said arms having a slot therein continuing through the flange of that arm and having an enlargement in such flange, whereby said slot is adapted to receive a headed pin rotatably to provide a swivel connection with that arm.

9. A fastening device comprising a strip of sheet metal bent intermediately to provide two spring arms which extend in the same general direction, each of the arms having a flange at its free end, whereby said arms may snugly embrace two angularly related portions of a supporting member, one of the arms being offset away from such supporting member and having a slot therein continuing through the flange of that arm and having an enlargement in such flange, whereby said slot is adapted to receive a headed pin rotatably to provide a swivel connection with that arm.

GEORGE A. TINNERMAN.

REFERENCES CITED

The following references are of record in the file of this patent:

UNITED STATES PATENTS

| Number | Name | Date |
|---|---|---|
| 466,932 | Cornell | Jan. 12, 1892 |
| 1,134,395 | Loepsinger | Apr. 6, 1915 |
| 1,654,383 | Parrish | Dec. 27, 1927 |
| 1,654,756 | Ryan | Jan. 3, 1928 |
| 1,680,723 | Bloom et al. | Aug. 14, 1928 |
| 2,327,326 | Churchill | Aug. 17, 1943 |
| 2,339,093 | Metheny | Jan. 11, 1944 |
| 2,355,096 | Morehouse | Aug. 8, 1944 |
| 2,382,945 | Trafton | Aug. 14, 1945 |
| 2,385,209 | Joyce | Sept. 18, 1945 |
| 2,390,750 | Tinnerman | Dec. 11, 1945 |

FOREIGN PATENTS

| Number | Country | Date |
|---|---|---|
| 352,114 | Great Britain | July 9, 1931 |